(12) United States Patent
McCulloch et al.

(10) Patent No.: US 8,864,234 B2
(45) Date of Patent: Oct. 21, 2014

(54) DISCONTINUOUS RECLINER WITH MOVABLE INTERNAL MEMORY STOP

(75) Inventors: Peter Robert McCulloch, Grosse Pointe Woods, MI (US); James S. Wawrzyniak, Warren, MI (US)

(73) Assignee: Lear Corporation, Southfield, MI (US)

( * ) Notice: Subject to any disclaimer, the term of this patent is extended or adjusted under 35 U.S.C. 154(b) by 336 days.

(21) Appl. No.: 13/483,332

(22) Filed: May 30, 2012

(65) Prior Publication Data

US 2013/0320735 A1    Dec. 5, 2013

(51) Int. Cl.
*B60N 2/235*    (2006.01)

(52) U.S. Cl.
USPC ..................................... 297/367 P

(58) Field of Classification Search
USPC ................. 297/367 P, 378.12, 362
See application file for complete search history.

(56) References Cited

U.S. PATENT DOCUMENTS

| 7,055,906 | B2 | 6/2006 | Shinozaki |
| 7,380,883 | B2 | 6/2008 | Koumura |
| 8,033,607 | B2 | 10/2011 | Kojima et al. |
| 2008/0231103 | A1* | 9/2008 | Rohee .................. 297/354.1 |
| 2010/0308635 | A1 | 12/2010 | Tame et al. |
| 2011/0115272 | A1 | 5/2011 | Kojima et al. |

* cited by examiner

*Primary Examiner* — Milton Nelson, Jr.
(74) *Attorney, Agent, or Firm* — Brooks Kushman P.C.

(57) ABSTRACT

A discontinuous recliner for a vehicle seat back that may be locked in a desired angular orientation. A memory function is provided by a memory pawl that is actuated by a memory handle. The memory pawl carries a memory pad in the memory disengaged position. The memory pawl carries the memory pad in a deactivated position and lodges the memory pad in internal gear teeth of a gear plate when the memory feature is activated. The memory pad rotates with the gear plate as the seat back is folded forward. When the seat back is returned to the memory position, the memory pad engages a stop on the memory pawl that is pivoted to move the memory pad out of engagement with the internal gear teeth of the gear plate.

15 Claims, 5 Drawing Sheets

DISCONTINUOUS RECLINER WITH MOVABLE INTERNAL MEMORY STOP

TECHNICAL FIELD

This disclosure relates to manual discontinuous vehicle seat recliner with a positionable stop for returning the seat back to a previously set angular position.

BACKGROUND

Vehicle seat recliners may be of the continuous type that are rotated to adjust the angle of the seat back and remain constantly engaged or may be of the discontinuous type that are released and locked into a desired angular position. Vehicle occupants may prefer to set the seat back in a particular angular orientation for comfort. Coupe style vehicles generally have a vehicle seat that is folded forward over the seat base by releasing the recliner to provide access to the area behind the front seat. After the seat back is folded forward, it is advantageous to provide an easy and reliable mechanism for returning the seat back to a previously set angular orientation.

The following published patent applications and patents were reviewed in the course of preparing this patent application: US 2010/0308635; US 2011/0115272; U.S. Pat. No. 7,055,906; U.S. Pat. No. 7,380,883; and U.S. Pat. No. 8,033,607.

SUMMARY

According to one aspect of this disclosure, a recliner is provided for a vehicle seat that moves between a folded forward position and a seating position. The recliner has a first plate that includes a plurality of internal gear teeth and a second plate that is pivotally retained adjacent the first plate. A seat angle adjustment mechanism is used to selectively lock the first and the second plates together in a desired angular orientation. A seat back release lever assembly releases the seat back independently of the seat angle adjuster to move the seat back between the seating position and the folded forward position. The seat back release lever assembly includes a pad carried by the seat back release lever assembly in a memory disengaged position. The pad is lodged in the internal gear teeth in a memory engaged position and is contacted by the seat back release lever assembly when the seat moves to the folded forward position.

According to another aspect of this disclosure, the seat back release lever assembly may further comprise a pivoting pawl secured to a pin that carries the pad in the memory disengaged position. A latch handle may be attached to the pin that is actuated to shift the seat back release lever assembly between the memory engaged position and the memory disengaged position. The pad may further include an arcuate gear segment having a plurality of external teeth that are lodged into the internal teeth when the pad is in the memory engaged position. The arcuate gear segment is detached from the pawl when the pad is in the memory engaged position. The arcuate gear segment is carried by the pawl when the pad is in the memory disengaged position.

According to another aspect of this disclosure, a recliner assembly for a vehicle seat is provided that comprises a discontinuous manual recliner that includes a seat back release lever assembly that releases the seat back to move the seat back between the seating position and the forward folded position. A pad is carried by the seat back release lever assembly in a memory disengaged position. The pad is lodged in the internal gear teeth in a memory engaged position that is contacted by the seat back release lever assembly when the seat moves back to the seating position.

According to further aspects of this disclosure, the seat back release lever assembly may further comprise a pivot plate. The seat back release lever assembly may further comprise a pivoting pawl secured to a pin that carries the pad in the memory disengaged position. The pivoting pawl may be controlled by a latch handle that switches the seat back release lever assembly between the memory engaged position and the memory disengaged position. The pivoting pawl pivots in one rotational direction to move the pad into engagement with the internal gear teeth of the pivotal plate and pivots in a second rotational direction to withdraw the pad from the internal gear teeth. The pivot plate defines an arcuate slot that receives the pin to constrain movement of the pivot plate. The pad does not limit movement of the seat back when the pad is in the memory disengaged position.

According to another aspect of this disclosure, a vehicle seat assembly is disclosed that includes a pair of recliner assemblies that are connected by a shaft that engages the hubs of the pair of recliner assemblies to force cooperation between the pair of recliner assemblies. The shaft is manually rotated to rotate each of the hubs causing each of the cams to rotate. A seat back release lever assembly is provided that releases the seat back independently of the lock elements to move the seat back between the seating position and the folded forward position. A stop is carried by the seat back release lever assembly in a memory disengaged position. The stop is lodged in the internal gear teeth in a memory engaged position. The stop is contacted by the seat back release lever assembly when the seat is moved from the forward folded position to the seating position and the stop is in the memory engaged position.

The above aspects of this disclosure and other aspects will be better understood in view of the attached drawings and the following detailed description of the illustrated embodiments.

BRIEF DESCRIPTION OF THE DRAWINGS

FIG. 3 is a cross-sectional view taken along the line 3-3 in FIG. 1;

DETAILED DESCRIPTION

The illustrated embodiments are disclosed with reference to the drawings. However, it is to be understood that the disclosed embodiments are intended to be merely examples that may be embodied in various and alternative forms. The figures are not necessarily to scale and some features may be exaggerated or minimized to show details of particular components. The specific structural and functional details disclosed are not to be interpreted as limiting, but as a representative basis for teaching one skilled in the art how to practice the present invention.

Figure 1:
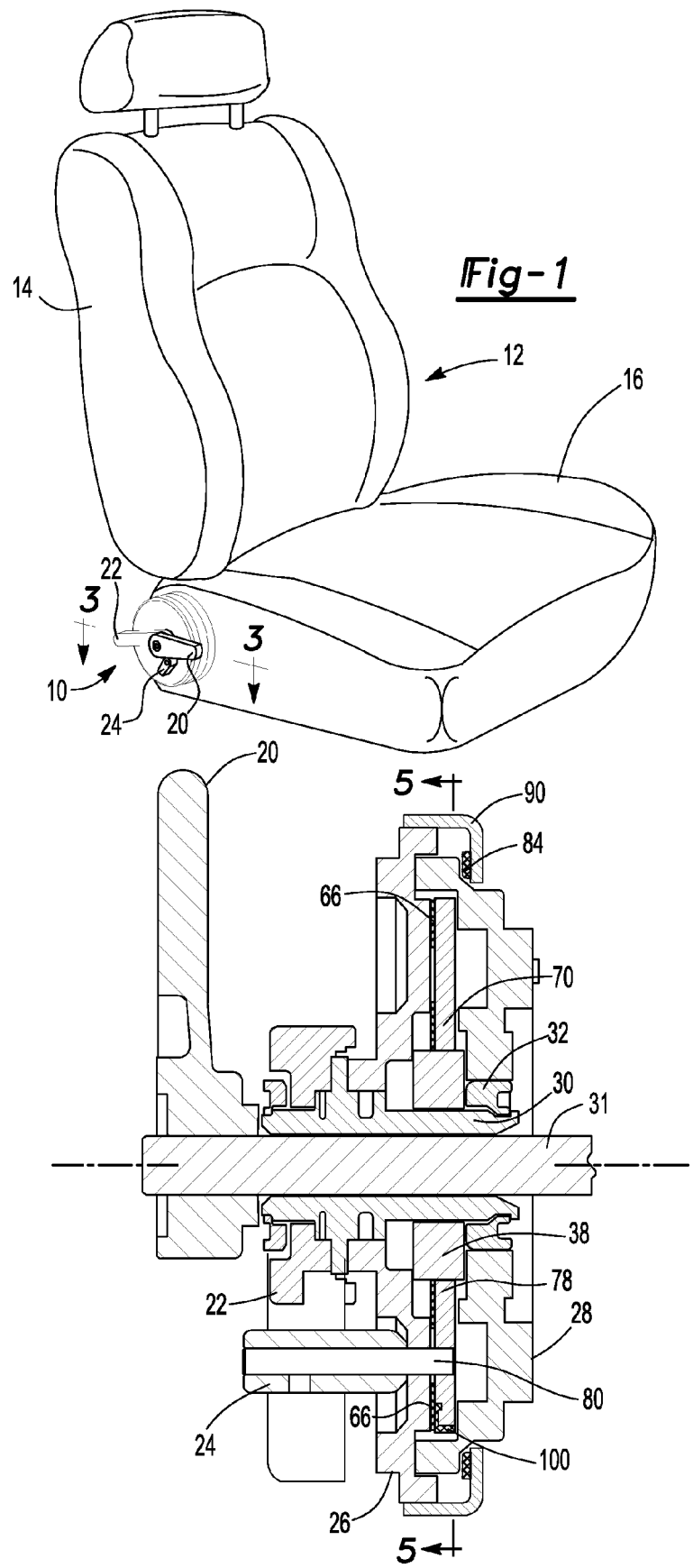
FIG. 1 is a perspective view of a vehicle seat with a seat recliner assembly.

Referring to FIG. 1, a recliner 10 is shown attached to a vehicle seat generally indicated by reference numeral 12. The vehicle seat 12 includes a seat back 14 and a seat base 16. The angle of the seat back 14 relative to the seat base 16 is set by adjusting the recliner 10. A seat angle adjustment handle 20 is grasped by a seat occupant and partially rotated to release the recliner. A spring (not shown) may be used to bias the seat back 14 in the forward direction when the recliner 10 is released, as is well known in the art. A memory handle 22 is also provided on the recliner 10 for setting and releasing a memory mechanism, as will be more fully described below, that allows the seat back 14 to be returned to a previous seat adjustment angle. A memory block 24 cooperates with the memory handle 22 that functions to normally bias the recliner out of the memory position.

Figure 2:
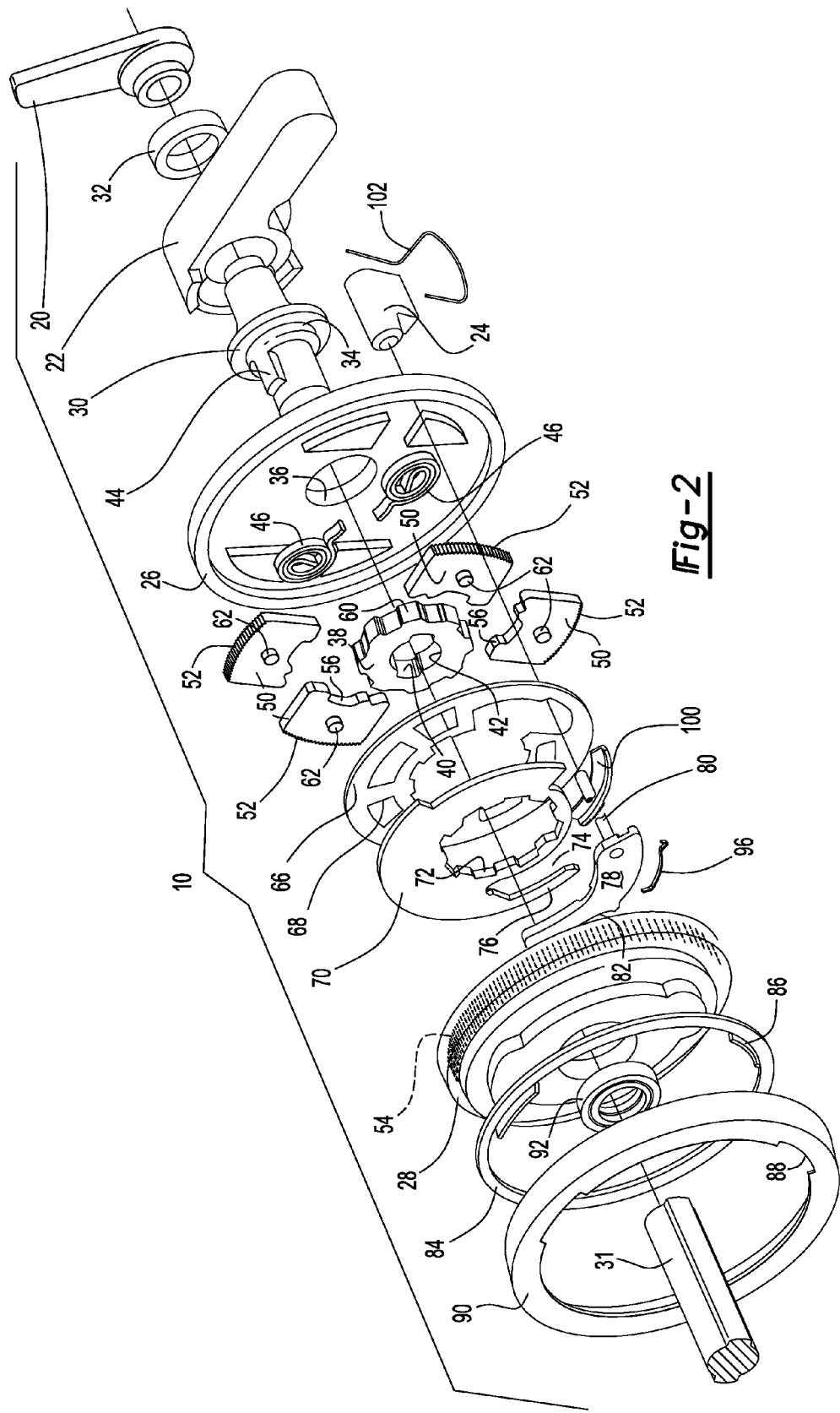
FIG. 2 is an exploded perspective view of a discontinuous seat recliner having a movable internal memory stop.

Referring to FIGS. 2 and 3, a recliner assembly 10 is shown in an exploded perspective view and a cross-sectional view, respectively. The recliner assembly 10 includes a guide plate 26 and a gear plate 28 that are assembled to a hub 30. The guide plate 26 and gear plate 28 are pivotable relative to each other. A shaft 31 engages the hubs 30 of the recliners 10. When the shaft 31 pivots, both of the hubs 30 are pivoted at the same time. A handle attachment clip 32 secures the seat angle adjustment handle 20 and memory handle 22 to one side of the guide plate 26. The hub 30 has a cylindrical surface 34 that is disposed within a hole 36 in the guide plate 26 when the hub 30 is assembled to the recliner assembly 10.

A cam 38 is also assembled to the hub 30. A keyway 40 is formed as part of an opening 42 in the cam 38. An integral key 44 on the hub 30 is inserted into the keyway 40 so that when the hub 30 is rotated, the rotational movement is communicated to the cam 38.

A pair of springs 46 are assembled to a guide plate 26. The springs 46 engage the cam 38 to exert a biasing force on the cam 38 that biases the cam 38 for rotation in one rotary direction.

A plurality of locking elements 50 (in the illustrated embodiment four locking elements 50 are provided) are assembled to the guide plate 26 for reciprocal movement. The locking elements 50 include external gear teeth 52 that are oriented to engage internal gear teeth 54 provided on the gear plate 28. A cam surface 56 is provided on the opposite side of the locking elements 50 from the gear teeth 52. The cam surface 56 engages the cam lobes 60 that are provided on the cam 38. A locking element control disk 66 is assembled over the cam 38 and locking elements 50. The locking element control disk 66 defines a plurality of cut-outs 68. A pin 62 is provided on each of the locking elements 50. The pins 62 are received in the cut-outs 68 of the locking element control disk 66. The cut-outs engage the pins 62 to coordinate movement of the locking elements 50 relative to the guide plate 26.

The memory release mechanism comprises, in part, a pivot disk 70 that is assembled to the opposite side of the locking element control disk 66 from the locking elements 50. The pivot disk 70 defines a cam lobe receiving opening 72 that is adapted to receive the cam 38. A clearance area 74 is provided on the pivot disk 70. The clearance area 74 is partially defined by a cam finger 76 formed on the pivot disk 70. A memory pawl 78 may be received within the clearance area 74 and is assembled to a pivot pin 80. The opposite end from the memory pawl 78 of the pivot pin 80 is connected to the memory block 24. A cam surface 82 is provided on the memory pawl 78 that is adapted to engage the cam finger 76.

A spacer 84 includes a plurality of anti-rotation tabs 86 that are received in a corresponding plurality of slots 88 formed on a case 90. A retainer clip 92 is assembled to the hub 30. The retainer clip 92 axially retains the hub 30.

A memory bias spring 96 is connected to the memory pawl 78. A memory pad 100 is carried by the memory pawl 78 when the pad 100 is in the memory disengage position. The memory pad 100 is lodged into the internal gear teeth 54 of the gear plate 28 when the pad is in the memory engage position. The spring 96 biases the memory pad 100 into engagement with the memory pawl 78 in the memory disengaged position.

Figure 4:
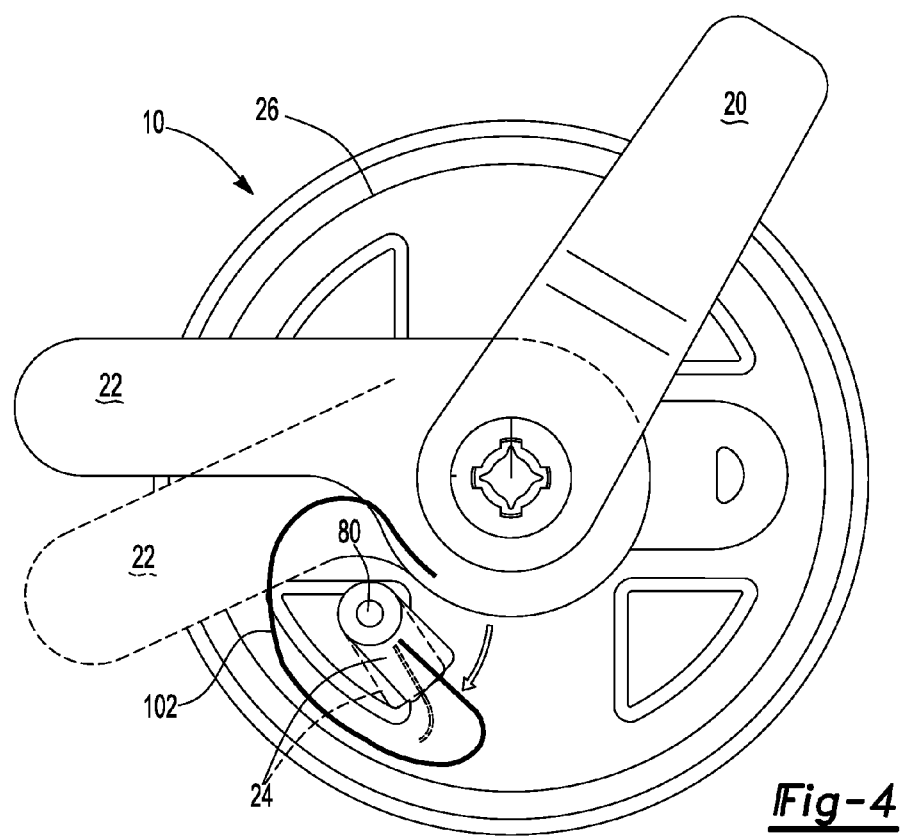
FIG. 4 is a side elevation view of a seat recliner in a normal position with the memory disengaged, the phantom lines illustrate the recliner in a memory engaged position.

Referring to FIG. 4, the recliner 10 is shown externally with the recliner handle 20 shown pivoted to actuate the recliner release. The recliner handle 20 may be actuated independently from the memory handle 22 and does not cause movement or engagement with the memory handle. The memory activation handle 22 is shown in solid lines in the memory disengage position and is shown in phantom lines in the memory engaged position. The memory block 24 is connected by a spring 102. The memory block 24 pivots the pin 80 that in turn pivots the memory pawl 78 to move the memory pawl 78 between the memory engaged and memory disengaged positions.

Figure 5:
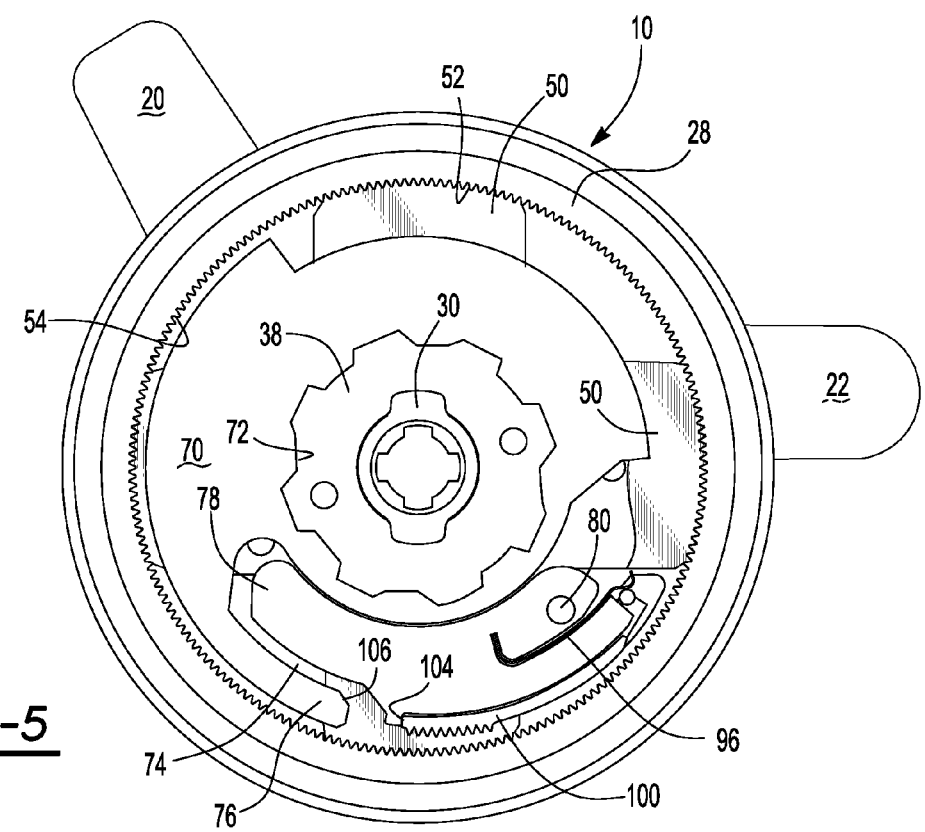
FIG. 5 is a cross-sectional view taken along the line 5-5 in FIG. 4 of the seat back release lever assembly in an initial locked position with the memory feature disengaged.

Referring to FIG. 5, the recliner is shown in the locked position with the memory disengaged. This corresponds to the position of the recliner 10 with the memory disengaged. When the recliner handle 20 in this position, the locking elements 50 are locked relative to the gear plate 28. The gear teeth 52 are engaging the internal gear teeth 54 on the gear plate 28. The memory pawl 78 is received within the clearance area 74. The clearance area 74 is defined on the pivot disk 70 by the cam finger 76. The memory pad 100 is disengaged from the internal teeth 52. The spring 102 (shown in FIG. 4) biases the memory pawl 78 to pivot about the pivot pin 80 in the clockwise rotational direction, as shown in FIG. 5. The hub 30 is received in the cam 38 and the pivot disk 70 is engaged by the cam disk 38 in the cam lobe receiving opening 72 of the pivot disk 70. The memory bias spring 96 biases the memory pad 100 into engagement with the memory pawl 78 when the memory is disengaged.

Figure 6:
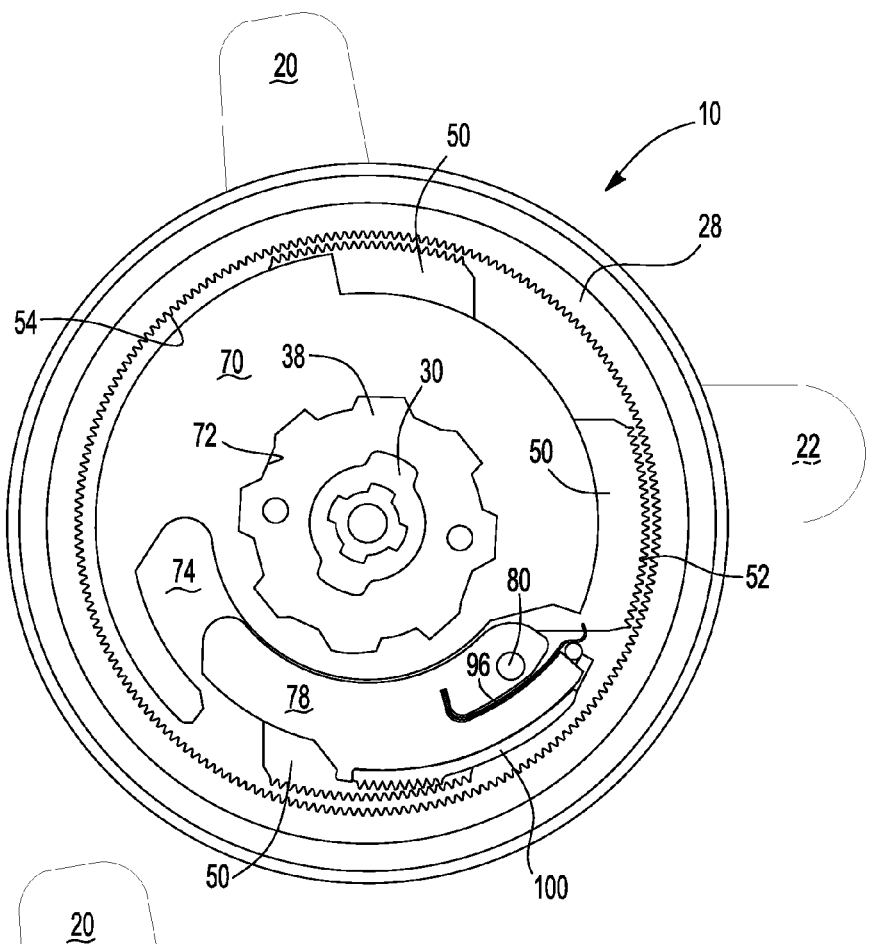
FIG. 6 is a cross-sectional view taken along the line 5-5 in FIG. 4 of the seat back release lever assembly in an unlocked position with the memory feature disengaged.

Referring to FIG. 6, the recliner 10 is shown in its unlocked position with the memory disengaged. In this position, the recliner can rotate normally without any memory function. The teeth 52 of the locking elements 50 are disengaged from the internal teeth 54 of the gear plate 28. The seat angle adjustment handle 20 has been moved in a clockwise direction. The movement of the seat angle adjustment handle 20 is communicated through the hub 30 that rotates the cam 38. The cam 38, being received in the cam lobe receiving opening 72, transmits the pivotal motion to the pivot disk 70. Pivot disk 70 also rotates in the clockwise direction. The memory pawl 78 remains stationary with the clearance area 74 of the pivot disk 70 rotating away from the memory pawl 78. The memory pad 100 remains disengaged from the internal teeth 54 of the gear plate 28 due to the biasing force exerted by the spring 102 on the memory pawl 78.

Figure 7:
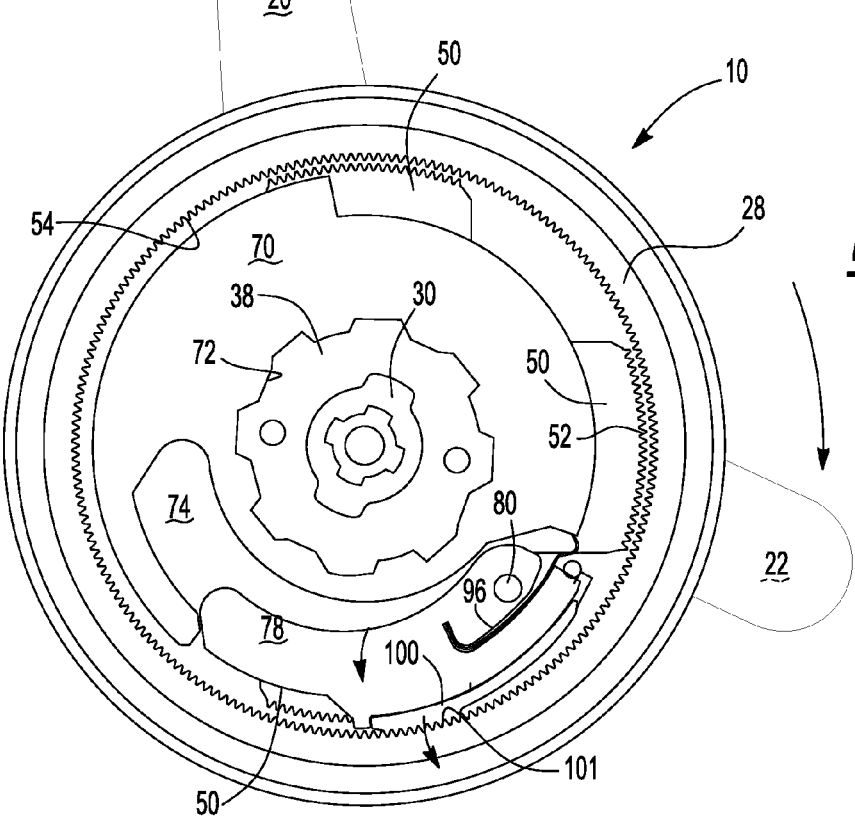
FIG. 7 is a cross-sectional view taken along the line 5-5 in FIG. 4 of the seat back release lever assembly unlocked with the memory handle rotated to the engaged position with the memory pad initially engaged with the internal teeth.

Referring to FIG. 7, the recliner 10 is shown with the memory handle rotated to the engaged position and the gear teeth 52 of the locking elements 50 are disengaged from the internal gear teeth 54 on the gear plate 28. The teeth 101 formed on the memory pad 100 engage the teeth 54 of the gear plate 28. The pivot disk 70 engages the memory pawl 78 to hold the recliner 10 in its unlocked position. The memory handle 22, as shown in FIG. 7, is pivoted in the clockwise direction, as shown by the directional arrow in FIG. 7, causing the pin 80 to rotate with its associated memory pawl 78. Actuating the memory handle 22 causes the memory pawl 78 to set the memory pad 100 with its teeth 101 engaging the teeth 54 of the gear plate 28.

Figure 8:
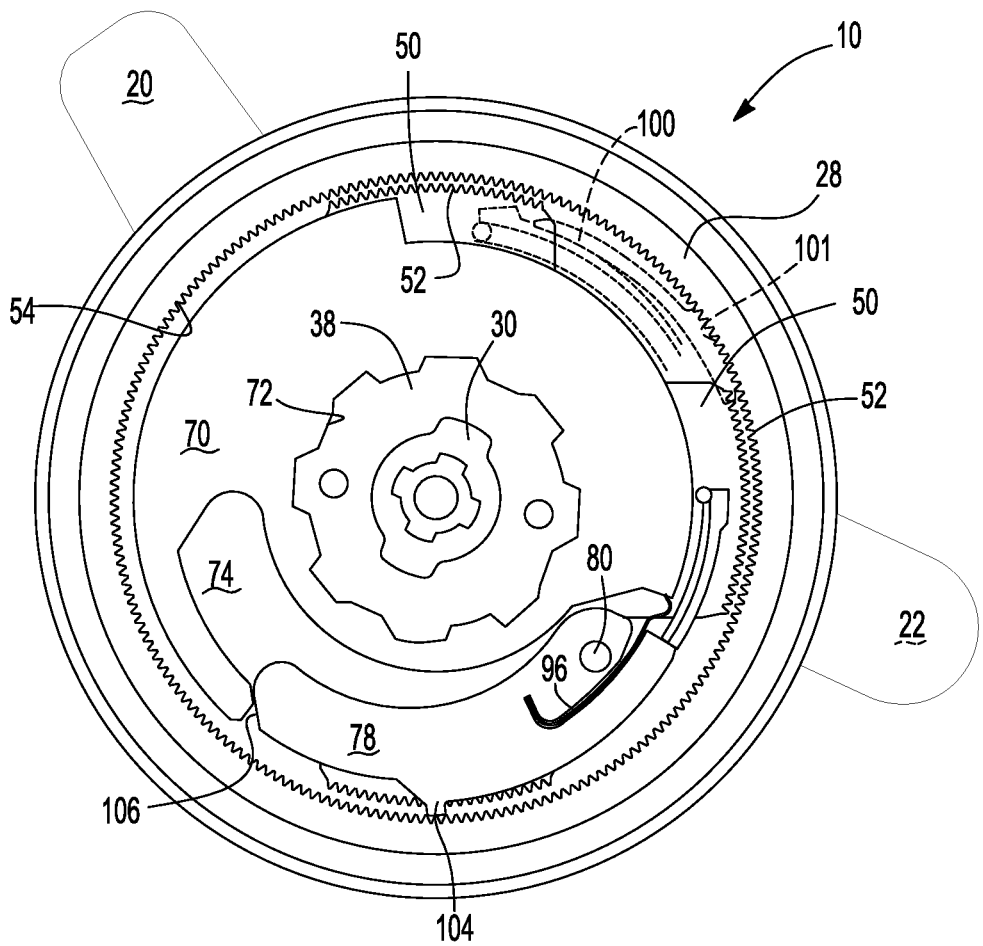
FIG. 8 is a cross-sectional view taken along the line 5-5 in FIG. 4 of the seat back release lever assembly unlocked with the memory pad engaged with the internal teeth and with the seat back in two positions, partially folded forward, and fully folded forward.

Referring to FIG. 8, the recliner 10 is shown in the memory engaged position with the seat back 14 (shown in FIG. 1) folded fully forward. The memory pad 100 is shown in phantom lines in FIG. 8 with its teeth 101 fully engaging the internal gear teeth 54 of the gear plate 28. The memory pad 100 travels with the gear plate 28 as the gear plate 28 is rotated with the seat back 14 being moved to its dumped forward position. When the seat back 14 is dumped fully forward, a rear seat occupant may enjoy unimpeded access to areas behind the seat back 14. The recliner 10 is returnable to the angular orientation of the seat back 14 at the time the seat back 14 was released by lifting the seat back 14 from the folded position. The memory pad 100 is shown in FIG. 8 in the memory engaged position. In this position, the seat back 14 is at an intermediate position. The memory pad 100 travels with the gear plate 28. A stop 104 is provided on the memory pawl 78 that stops the rotation of the memory pad 100 when it is returned to the memory set position.

As shown in FIG. 8, the memory pad 100 is in a position to be reconnected to the memory pawl 78 as gear plate 28 rotates and carries memory pad 100 in the clockwise direction. Rotation of the gear plate 28 continues until the recliner 10 is in the position shown in FIG. 4.

Referring to FIG. 5, the recliner 10 is shown as it returns to the memory set position. Once the recliner 10 is returned to the memory set position, the pad 100 engages the stop 104. The memory pawl 78 includes a cam surface 106 that moves the memory pawl 78 radially inwardly when the cam surface 106 contacts the cam finger 78 of the pivot disk 70. This forces the memory pad 100 and its teeth 101 out of engagement with internal gear teeth 54 of the gear plate 28. The recliner is returned to the locked position shown in FIG. 5. Rotation of the memory pad 100 with the gear plate 28 continues until the memory pad 100 engages the stop 104 on the memory pawl 78. The cam surface 106 on the memory pawl 78 also functions to pivot the memory pawl 78 while carrying the memory pad 100 is moved out of engagement with the teeth 54 of the gear plate 28. The memory bias spring 96 holds the memory pad 100 in engagement with the memory pawl 78 when the memory feature is disengaged. The gear teeth 52 of the locking elements 50 re-engage the gear plate 28 after the memory pawl 78 is tripped back into its disengaged position.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A recliner assembly for a vehicle seat that has a seat back that moves between a folded forward position and a seating position, the recliner assembly comprising:
   a first plate that has a plurality of internal gear teeth;
   a second plate pivotally retained adjacent the first plate;
   a seat back recliner selectively locking the first and second plates together in a desired angular orientation; and
   a seat back release lever assembly that is actuated to release the seat back independently of the seat back recliner to move the seat back between the seating position and the folded forward position, wherein the seat back release lever assembly includes a pad carried by the seat back release lever assembly in a memory disengaged position, wherein the pad is lodged in the internal gear teeth in a memory engaged position, and wherein the pad is engaged by the seat back release lever assembly when the seat back moves to the folded forward position and the pad is in the memory engaged position.

2. The recliner assembly of claim 1 wherein the seat back release lever assembly further comprises a pivoting pawl secured to a pin, the pivoting pawl carries the pad in the memory disengaged position.

3. The recliner assembly of claim 2 further comprising a latch handle connected to the pin by a spring that is actuated to shift the seat back release lever assembly between the memory engaged position and the memory disengaged position.

4. The recliner assembly of claim 2 wherein the pad further includes an arcuate gear segment having a plurality of external teeth that are lodged into the internal teeth when the pad is in the memory engaged position.

5. The recliner assembly of claim 4 wherein the arcuate gear segment is detachable from the pawl when the pad is in the memory engaged position and wherein the arcuate gear segment is carried by the pawl when the pad is in the memory disengaged position.

6. The recliner assembly of claim 1 wherein the pad is detachable from the seat back release lever assembly when the pad is in the memory engaged position and wherein the pad is carried by the seat back release lever assembly in the memory disengaged position.

7. The recliner assembly of claim 6 wherein the pad is carried by a pivoting pawl that is part of the seat back release lever assembly.

8. A seat back recliner assembly for a vehicle seat comprising:
   a guide plate adapted to be secured to one of a seat bottom or a seat back;
   a pivotal plate adapted to be secured to the other one of the seat bottom or seat back pivotally connected to the guide plate about a pivotal axis, the pivotal plate having internal gear teeth;
   a cam pivotally connected to the pivotal plate;
   a plurality of lock elements cooperating with the guide plate and the cam for translation relative to the pivotal plate;
   a seat back release lever assembly that releases the seat back independently of the lock elements to move the seat back between a folded forward position and a seating position; and
   a pad carried by the seat back release lever assembly in a memory disengaged position, and wherein the pad is lodged in the internal gear teeth in a memory engaged position, and wherein the pad is engaged by the seat back release lever assembly when the seat back moves to the folded forward position and the pad is in the memory engaged position.

9. The recliner assembly of claim 8 wherein the seat back release lever assembly further comprises a pivot plate attached to the cam that moves with the seat back when the lock elements are translated relative to the guide plate.

10. The recliner assembly of claim 9 wherein the seat back release lever assembly further comprises a pivoting pawl secured to a pin, the pivoting pawl carries the pad in the memory disengaged position.

11. The recliner assembly of claim 10 wherein the pivoting pawl is controlled by a latch handle that switches the seat back release lever assembly between the memory engaged position and the memory disengaged position.

12. The recliner assembly of claim 11 wherein the pivoting pawl pivots in one rotational direction to move the pad into engagement with the internal gear teeth of the pivotal plate and pivots in a second rotational direction to withdraw the pad from the internal gear teeth.

13. The recliner assembly of claim 10 wherein the pivot plate defines an arcuate slot, wherein the pin is received in the slot, and wherein movement of the pivot plate is constrained by the movement of the pin within the slot.

14. The recliner assembly of claim 8 wherein the pad does not limit movement of the seat back when the pad is in the memory disengaged position.

15. A seat assembly for use in a vehicle comprising:
a seat bottom;
a seat back;
a pair of seat back recliners each including:
   a guide plate adapted to be secured to the seat bottom,
   a pivotal plate adapted to be secured to the seat back which is pivotally connected to the guide plate about a pivotal axis, the pivotal plate having internal gear teeth,
   a cam pivotally connected to the pivotal plate, the cam providing a plurality of cam lobes,
   a plurality of lock elements cooperating with the guide plate and the cam for translation relating to the guide plate, the lock elements each having a gear segment provided radially outward thereon to each cooperate with the internal gear teeth of the pivotal plate,
   a plurality of springs cooperating with the guide plate and the cam for urging the cam to translate the gear segments of the lock elements into engagement with the internal gear teeth of the pivotal plate; and
a shaft engages a hub of each of the pair of recliners, wherein the shaft manually pivots both of the hubs at the same time to rotate the cams;
a seat back release lever assembly that releases the seat back independently of the lock elements to move the seat back between a folded forward position and a seating position; and
a pad carried by the seat back release lever assembly in a memory disengaged position, and wherein the pad is lodged in the internal gear teeth in a memory engaged position, and wherein the pad is engaged by the seat back release lever assembly when the seat back moves to the seating position and the pad is in the memory engaged position.

* * * * *